Patented Dec. 27, 1927.

1,654,229

UNITED STATES PATENT OFFICE.

BERNHARD WURZSCHMITT, OF UERDINGEN-NIEDERRHEIN, GERMANY, ASSIGNOR TO I. G. FARBENINDUSTRIE AKTIENGESELLSCHAFT, OF UERDINGEN-NIEDERRHEIN, GERMANY, A CORPORATION OF GERMANY.

COMPOSITION FOR IMPREGNATING WOOD.

No Drawing. Application filed June 17, 1926, Serial No. 116,708, and in the Netherlands June 15, 1925.

This invention relates to improvements in the art of preserving wood by impregnation and more particularly to compositions for this purpose.

Mixtures of inorganic salts with organic nitro compounds, especially the aromatic hydroxy nitro compounds, such as the dinitrophenols and dinitrocresols and their salts, have been used for a long time for the preservation of wood. Such mixtures have a very strong fungicidal action but have the disadvantage that the aqueous solutions thereof used for impregnating corrode the iron parts of the apparatus employed in the impregnating operation.

According to the present invention the detrimental action of the solutions upon iron is eliminated by providing a small amount of formaldehyde in the solutions. The formaldehyde may be supplied as such or in the form of formaldehyde compounds or complexes, such as the combinations of formaldehyde with ammonia, amines and amides which yield formaldehyde by spontaneous decomposition under the conditions of use.

Especially good results are obtained when in addition to formaldehyde, primary aromatic amines and zinc compounds are added to the solutions, i. e., by the addition of formaldehyde or a compound yielding formaldehyde such as the formaldehyde ammonia or formaldehyde amine or formaldehyde amide combinations referred to in the impregnating compositions described in United States Patent No. 1,500,066, together with the water insoluble basis zinc compounds, such as zinc oxide, referred to in the same patent.

Example.—Wood is impregnated in the known manner with the employment of pressure and vacuum with a solution which contains 1.5 kilograms of dinitrophenol, 7.5 kilograms of sodium fluoride, 0.5 kilograms of zinc chloride, 0.75 kilograms of anilin and 1 kilogram of 40 percent formaldehyde solution (formalin) per cubic meter of solution.

The formaldehyde in the mixture in addition to its action in protecting the iron parts of the impregnating apparatus against corrosion serves to retard the leaching of the preserving agents out of the impregnated wood.

I claim:

1. A wood preserving composition comprising an organic nitro compound and formaldehyde.

2. A wood preserving composition comprising an organic nitro compound, a water-soluble fluoride and formaldehyde.

3. A wood preserving composition comprising an organic nitro compound, a water-soluble fluoride, a water insoluble basic zinc compound, and formaldehyde.

4. A wood preserving agent comprising an organic nitro compound, a water-soluble fluoride, a water insoluble basic zinc compound, an aromatic amine, and formaldehyde.

5. In processes of impregnating wood with aqueous solutions containing organic nitro compounds in apparatus in which the solutions come in contact with iron, protecting the iron against corrosion by providing a small amount of formaldehyde in the solutions.

In testimony whereof, I affix my signature.

BERNHARD WURZSCHMITT.